Patented July 29, 1952

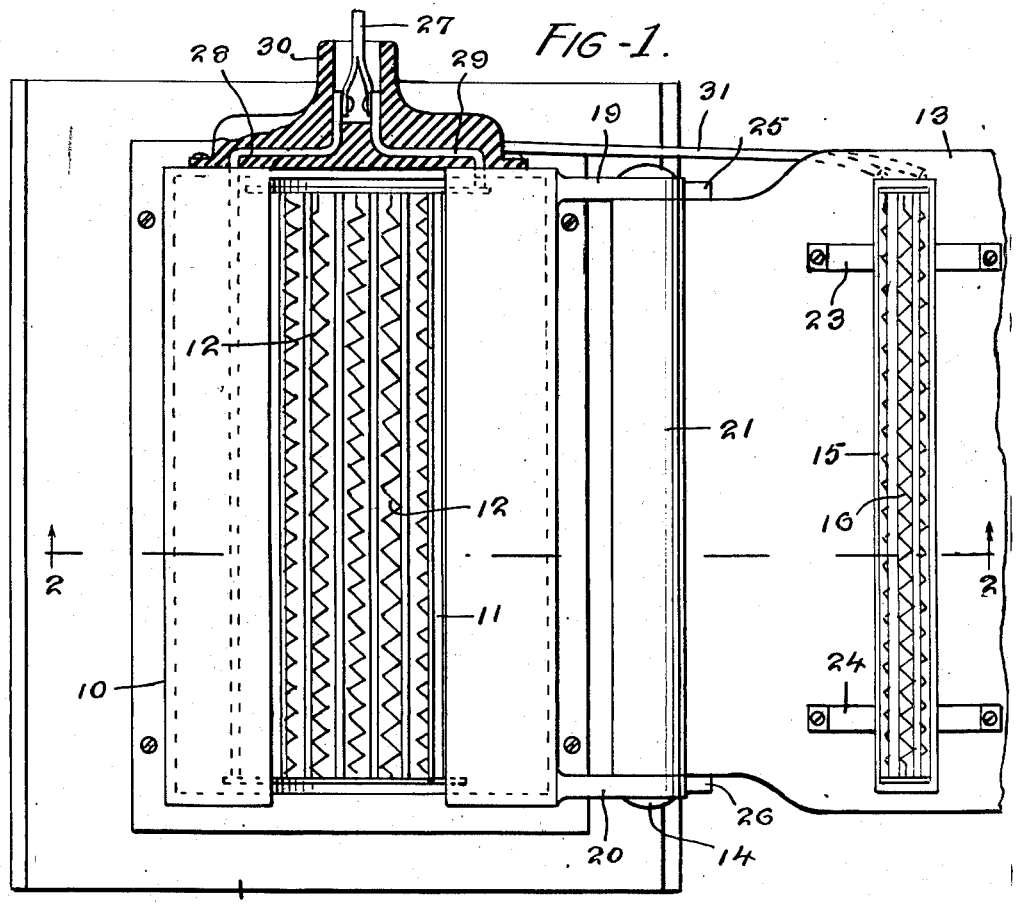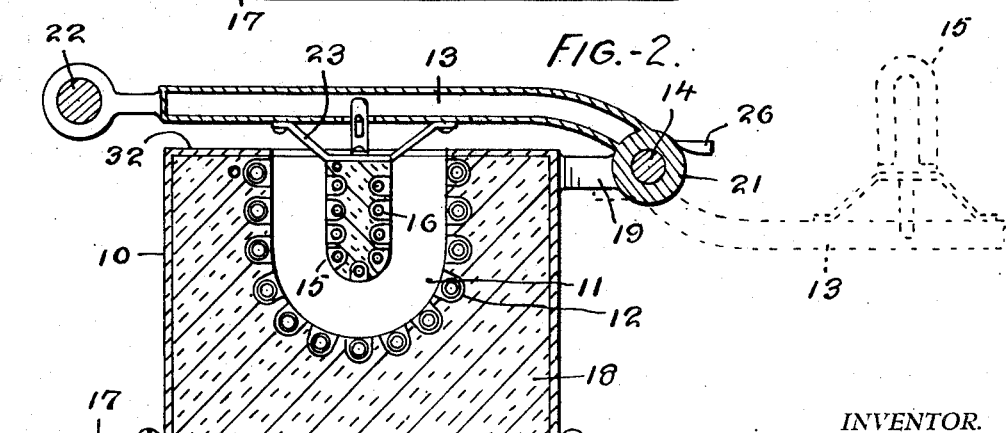

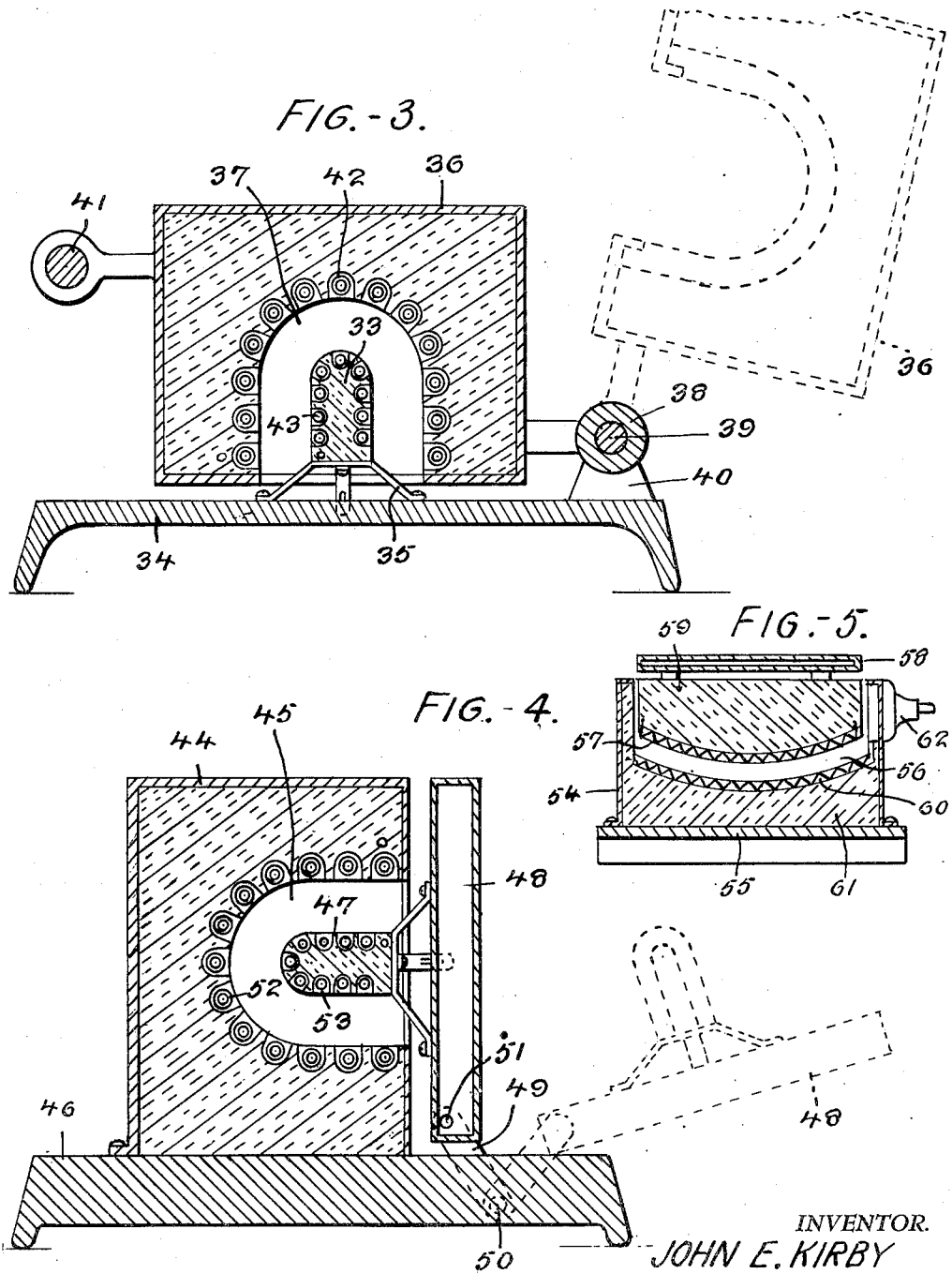

2,604,841

UNITED STATES PATENT OFFICE 2,604,841

ARCUATE TOASTER

John Elwyn Kirby, Harlingen, Tex.

Application August 16, 1949, Serial No. 110,535

1 Claim. (Cl. 99—383)

This invention relates to electric toasters commonly used for toasting slices of bread, cereal products, and the like, and in particular a toaster having an arcuate slice of bread receiving slot whereby a slice of bread is toasted on a curve or U-shaped in cross section so that a weiner or hot dog may readily be inserted therein.

The purpose of this invention is to facilitate making sandwiches with weiners by using sliced bread which is normally flat.

It is difficult to wrap a slice of bread around a weiner and at the same time apply mustard or other filling, and where the bread is toasted it breaks as it is folded over the weiner. With this thought in mind this invention contemplates a toaster having a U-shaped slice of bread receiving slot therein so that as the bread is toasted it is formed into an envelope into which a weiner may conveniently be placed.

The object of this invention is, therefore, to provide means for constructing a toaster so that an open U-shaped slot with heating elements distributed over the surface thereof is provided in a housing in combination with a hinged member having a core, also having heating elements distributed over the surface thereof, positioned to be inserted into the center of the slot whereby with a slice of bread positioned over the slot the core will bend the slice of bread forming it into the shape of a U and hold it in this shape until it is toasted.

Another object of the invention is to provide a device for toasting slices of bread in the form of a U which is portable.

A further object of the invention is to provide an electric toaster for forming and toasting bread in the shape of a U which is of a comparatively simple and economical construction.

With these and other objects and advantages in view the invention embodies a toaster formed with two hinged elements with a U-shaped opening or slot in one element and a core on the other element mounted to be inserted into the slot, and means for supplying heat to the elements.

Other features and advantages of the invention will appear from the following description taken in connection with drawings wherein:

Figure 1 is a plan view of the toaster with the cover in the open position and with the outer edge of the cover away.

Figure 2 is a cross section through the toaster taken on line 2—2 of Figure 1 showing the toaster in the closed position in full lines and with the cover in the open position in dotted line, and with parts broken away.

Figure 3 is a similar cross section illustrating a modification wherein the core is stationary and the housing with the U-shaped slot therein pivotally mounted in combination therewith.

Figure 4 is a similar section showing a further modification wherein the parts are positioned for horizontal movement of the core into the slot.

Figure 5 is a longitudinal section through the toaster illustrating a further modification wherein the toasting elements are shaped to bend a slice of bread both longitudinally and transversely.

Referring now to the drawings wherein like reference characters denote corresponding parts the U-shaped toaster of this invention includes a housing 10 having a U-shaped slot 11 therein with heating elements 12 around the slot, and a cover 13 pivotally mounted on the housing 10 by a pin 14 and having a core 15 with heating elements 16 therein suspended from the cover and positioned to enter the slot 11.

In the design illustrated in Figures 1 and 2 the housing 10 is mounted on a base 17 and the interior is filled with a suitable insulating or plastic material as indicated by the numeral 18 and in which the heating elements 12 are embedded.

The pin 14 is held in extended arms 19 and 20 that are positioned at the upper end of the housing and a hub 21 of the cover 13 is positioned on the pin 14 between the arms 19 and 20. The cover is provided with a handle 22 which extends from the opposite side and the core 15 is suspended from the underside by brackets 23 and 24. The hub 21 may be provided with stops 25 and 26 which are positioned to engage the under surfaces of the arms 19 and 20, respectively as shown in dotted lines in Figure 2 so that the cover may be held outwardly in a horizontal position when open.

Electric current may be supplied to the heating elements 12 and 16 through a feed wire 27 that is connected to buss wires 28 and 29 in a socket 30 and the buss bars may be directly connected to the element 12, as shown, and connected to the element 16 by wires in a cable 31, as shown in Figure 1.

With the parts arranged in this manner a slice of bread is placed upon the upper surface 32 of the housing 10 with the cover open and as the cover is closed the core 15 forces the slice of bread downwardly into the slot 11 whereby the bread is held in a U-shape as it is toasted. After the bread is toasted the cover is opened and the slice of bread removed.

In the design illustrated in Figure 3 a slice of bread is placed over a core 33 supported on a stand 34 by bracket 35, and a housing 36 having a U-shaped slot 37 therein is brought downwardly over the slice of bread forming the slice of bread into a U shape. The housing 36 is provided with a hub 38 through which it is pivotally mounted on the stand 34 by a pin 39 in bearings 40. The housing 36 is also provided with a handle 41 by which it may be raised and lowered, and heating elements 42 are provided in the housing with corresponding heating elements 43 in the core 33.

In the design illustrated in Figure 4 a housing 44 having a U-shaped slot 45 therein is positioned on a stand 46 with the slot in a horizontal position and a core 47, carried by a closure element 48 is adapted to be inserted into the slot to form a slice of bread held over the outer end of the slot in the shape of a U. The closure 48 is pivotally mounted by links 49 on the stand 46 with the links attached to the stand by a pin 50 and to the closure by pin 51. The housing 44 is provided with heating elements 52 and the core 47 is provided with corresponding heating elements 53.

It will be understood, therefore, that the core and slot may be mounted in various positions so that a slice of bread placed over the open end of the slot may be formed into a U or curve as it is forced into the slot and as heat is applied the slice of bread will be toasted in this position so that it is formed to conveniently receive weiners with mustard or other filling material.

In the design illustrated in Figure 5 a housing 54 mounted on a base 55 is provided with a U-shaped slot 56 similar to the slot 11 and the slot 56, instead of extending straight through the housing, is formed on an arc whereby a slice of bread will be toasted in the form of a holder with an arcuate back. In this design the upper heating element 57, which is suspended from a hinged cover 58, is formed in an arc to correspond with the slot 56. The heating element 57 is embedded in insulating material 59 and a heating element 60, in the lower part of the housing is embedded in insulating material 61. Current is supplied to the heating elements through a plug 62.

It will be understood that other modifications may be made in the design and arrangement of the parts without departing from the spirit of the invention.

What is claimed is:

In a toaster, the combination which comprises a horizontally disposed base, an elongated box-like housing having side and end walls and an upper surface mounted on the base, said housing having a centrally positioned longitudinally disposed slot U-shaped in cross section extended through the intermediate part thereof and through the said end walls, arms with bearings in the ends thereof extended from one side of the said housing, a cover having a handle extended from one edge positioned between and pivotally mounted in the bearings of the said arms, said cover positioned above and spaced from the upper surface of the housing in the closed position, a core U-shaped in cross section carried by and depending from the said cover, said core positioned in the said U-shaped slot of the housing and spaced from the lower end and side walls of the slot with the cover in the closed position upon the housing whereby a slice of bread positioned upon the upper surface of the housing is pressed into the shape of a U in cross section as the core is pressed into the slot upon closing of the cover, electric heating elements positioned in the surface of the core, electric heating elements mounted in the housing and positioned around the said slot, and insulating material filling the interior of the core and interior of the said housing.

JOHN ELWYN KIRBY.

REFERENCES CITED

The following references are of record in the file of this patent:

UNITED STATES PATENTS

| Number | Name | Date |
| --- | --- | --- |
| 1,543,221 | Matson | June 23, 1925 |
| 1,959,594 | Mattassa | May 22, 1934 |
| 1,974,204 | Cooter | Sept. 18, 1934 |
| 2,125,589 | Shuman | Aug. 2, 1938 |
| 2,473,402 | Wood | June 14, 1949 |